United States Patent [19]
Song et al.

[11] Patent Number: 6,030,647
[45] Date of Patent: Feb. 29, 2000

[54] CONTINUOUS CHEWING GUM MANUFACTURING PROCESS FOR GUM WITH CONTROLLED FLAVOR RELEASE

[75] Inventors: Joo H. Song, Des Plaines; Christafor E. Sundstrom, Glen Ellyn; David W. Record, River Forest, all of Ill.; Donald J. Townsend, Moores Hill, Ind.; Kevin B. Broderick, Berwyn; Philip G. Schnell, Downers Grove, both of Ill.

[73] Assignee: Wm. Wrigley Jr. Company, Chicago, Ill.

[21] Appl. No.: 09/359,630

[22] Filed: Jul. 22, 1999

Related U.S. Application Data

[63] Continuation-in-part of application No. 08/526,966, Sep. 12, 1995, abandoned, which is a continuation-in-part of application No. 08/362,254, Dec. 22, 1994, Pat. No. 5,543,160, which is a continuation-in-part of application No. 08/305,363, Sep. 13, 1994, abandoned.

[51] Int. Cl.[7] ........................................ A23G 3/30
[52] U.S. Cl. ................. 426/3; 426/534; 426/658
[58] Field of Search ................... 426/3, 4, 5, 6, 426/658, 548, 534

[56] References Cited

U.S. PATENT DOCUMENTS 5,045,325  9/1991  Lesko et al. .................... 426/3
5,543,160  8/1996  Song et al. ..................... 426/3

*Primary Examiner*—Milton Cano
*Attorney, Agent, or Firm*—Steven P. Shurtz; Brinks Hofer Gilson & Lione

[57] ABSTRACT

A method of producing chewing gum with a controlled flavor release comprises the steps of continuously adding chewing gum ingredients to a continuous mixer, the chewing gum ingredients comprising one or more flavoring agents, the continuous mixer comprising a plurality of spatially separated feed inlets through which the chewing gum ingredients are added to the mixer, and the one or more flavoring agents being added to the mixer simultaneously at two or more feed inlets; subjecting the chewing gum ingredients to a continuous mixing operation within the mixer, thereby forming a chewing gum composition; and continuously discharging the chewing gum composition from the mixer while chewing gum ingredients continue to be introduced and mixed within the mixer. The locations at which the flavor components are added controls the flavor characteristics of the chewing gum composition.

26 Claims, 6 Drawing Sheets

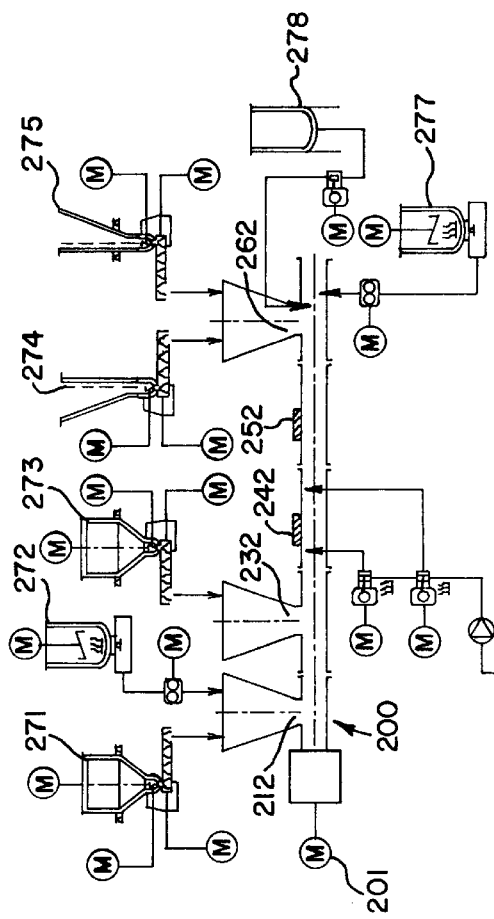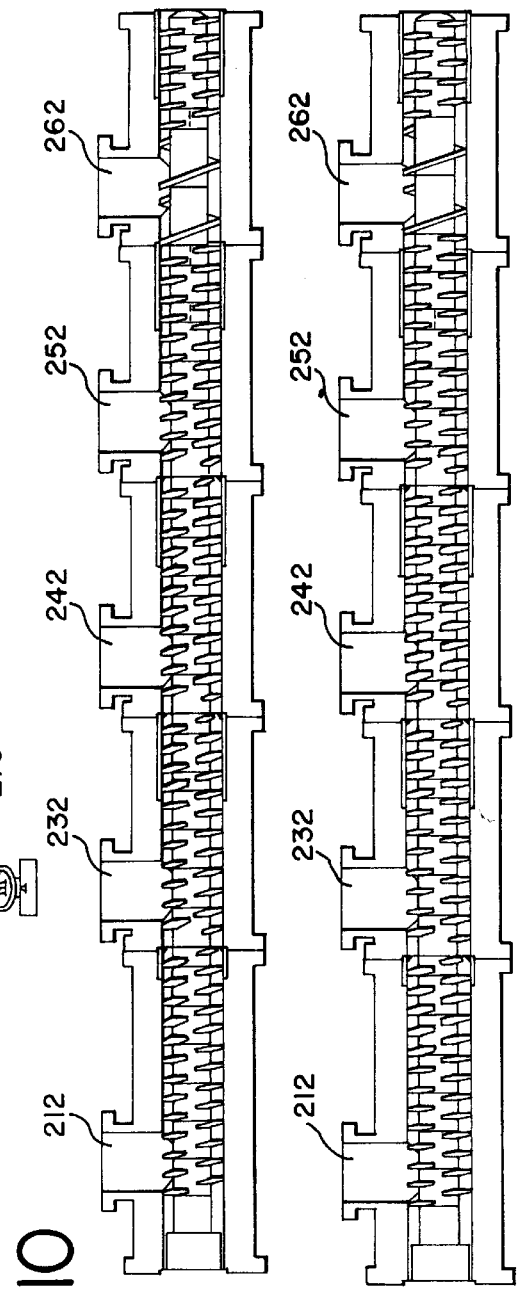

CONTINUOUS CHEWING GUM MANUFACTURING PROCESS FOR GUM WITH CONTROLLED FLAVOR RELEASE

CROSS REFERENCE TO RELATED APPLICATIONS

The present application is a continuation-in-part of U.S. application Ser. No. 08/526,966 filed Sep. 12, 1995, now abandoned, which in turn is a continuation-in-part of U.S. application Ser. No. 08/362,254, filed on Dec. 22, 1994, now U.S. Pat. No. 5,543,160, which in turn is a continuation-in-part of U.S. application Ser. No. 08/305,363, filed on Sep. 13, 1994, now abandoned. Each of the foregoing patent and applications are incorporated herein by reference.

FIELD OF THE INVENTION

The present invention relates to a continuous process for making chewing gum that produces a chewing gum product with a controlled flavor release. More particularly, the invention relates to a process for making gum in a continuous mixer where the points of addition of flavoring agents are controlled to produce a chewing gum with desired flavor release characteristics.

BACKGROUND OF THE INVENTION

In a conventional chewing gum manufacturing process, a double arm Sigma blade mixer is used to mix chewing gum ingredients. Gum base, bulking agents such as sugar or sorbitol for sugarless gum, liquids such as syrup or liquid sorbitol, softeners such as glycerin and lecithin, and flavors are mixed about 5–20 minutes to manufacture the gum.

This conventional gum making process, using batch mixing, involves an open mixer that allows flavor components to be lost by volatilization or degradation, particularly during the relatively long mixing times required to incorporate the flavor into the chewing gum composition. This is true even though flavor is typically added as the last ingredient, and mixed at the minimum temperatures needed for mixing. While most gum flavors, like spearmint, peppermint, cinnamon and wintergreen are subject to volatilization, fruit flavors are especially susceptible to this problem.

In conventional gum manufacturing, the time at which flavors are added effects the flavor release during chewing. For example, a gum mixed with flavor for extended time periods, longer than 5 minutes, will have a slow flavor release. However, this is not practical in the batch process because a mixing time of 10 or 15 minutes causes much of the flavor to be lost. Thus, optimized flavor perception in the final gum product may have to be sacrificed for the sake of keeping the level of flavor volatilization and degradation to a minimum.

Conventionally, chewing gum base and chewing gum products have been manufactured using separate mixers, different mixing technologies and, often, at different factories. One reason for this is that the optimum conditions for manufacturing gum base, and for manufacturing chewing gum from gum base and other ingredients such as sweeteners and flavors, are so different that it has been impractical to integrate both tasks. Chewing gum base manufacture, on the one hand, involves the dispersive (often high shear) mixing of difficult-to-blend ingredients such as elastomer, filler, elastomer plasticizer, base softeners/emulsifiers and, sometimes wax, and typically requires long mixing times. Chewing gum product manufacture, on the other hand, involves combining the gum base with more delicate ingredients such as product softeners, bulk sweeteners, high intensity sweeteners and flavoring agents using distributive (generally lower shear) mixing, for shorter periods.

In order to improve the efficiency of gum base and gum product manufacture, there has been a trend toward the continuous manufacture of chewing gum bases and products. U.S. Pat. No. 3,995,064, issued to Ehrgott et al., discloses the continuous manufacture of gum base using a sequence of mixers or a single variable mixer. U.S. Pat. No. 4,459,311, issued to DeTora et al., also discloses the continuous manufacture of gum base using a sequence of mixers. Other continuous gum base manufacturing processes are disclosed in European Patent Publication No. 0,273,809 (General Foods France) and in French Patent Publication No. 2,635,441 (General Foods France).

U.S. Pat. No. 5,045,325, issued to Lesko et al., and U.S. Pat. No. 4,555,407, issued to Kramer et al., disclose processes for the continuous production of chewing gum products. In each case, however, the gum base is initially prepared separately and is simply added into the process. U.S. Pat. No. 4,968,511, issued to D'Amelia et al., discloses a chewing gum product containing certain vinyl polymers which can be produced in a direct one-step process not requiring separate manufacture of gum base. However, the disclosure focuses on batch mixing processes not having the efficiency and product consistency achieved with continuous mixing. Also, the single-step processes are limited to chewing gums containing unconventional bases which lack elastomers and other critical ingredients.

There is a need for a continuous chewing gum manufacturing process that yields a gum with controlled flavor release. Even more beneficial would be an integrated continuous manufacturing process having the ability to combine chewing gum base ingredients and other chewing gum ingredients in a single continuous mixer in a way that reduces flavor loss and yields gum with controlled flavor release characteristics.

SUMMARY OF THE INVENTION

The present invention is a method for the continuous manufacture of a wide variety of chewing gum products using a continuous mixer and yielding a gum with controlled flavor release. Preferably the mixer is a single, high-efficiency mixer which does not require the separate manufacture of chewing gum base.

In a first aspect, the invention is a method of producing chewing gum with a controlled flavor release comprising the steps of:

a) continuously adding chewing gum ingredients to a continuous mixer, the chewing gum ingredients comprising one or more flavoring agents, the continuous mixer comprising a plurality of spatially separated feed inlets through which the chewing gum ingredients are added to the mixer, and the one or more flavoring agents being added to the mixer simultaneously through at least two of the feed inlets;

b) subjecting the chewing gum ingredients to a continuous mixing operation within the mixer, thereby forming a chewing gum composition; and c) continuously discharging the chewing gum composition from the mixer while chewing gum ingredients continue to be introduced and mixed within the mixer.

In a second aspect, the invention is a method of controlling the flavor release characteristics of a chewing gum composition comprising the steps of:

a) continuously adding chewing gum ingredients, including one or more flavoring agents, into a continuous mixer having a plurality of spatially separated feed inlets serving as locations into which the chewing gum ingredients are added to the mixer, the one or more flavoring agents being added to the mixer simultaneously through at least two or more of the feed inlets;

b) subjecting the chewing gum ingredients to a continuous mixing operation within the mixer, thereby forming a chewing gum composition;

c) continuously discharging the chewing gum composition from the mixer while chewing gum ingredients continue to be introduced and mixed within the mixer; and d) selecting the locations at which the one or more flavoring agents are added to the mixer for the purpose of controlling the flavor release characteristics of the chewing gum composition; the chewing gum composition being discharged having flavor release characteristics dependent on the locations at which the one or more flavoring agents are added to the mixer.

For continuous gum manufacturing, flavor may be added in any number of locations on the mixer. Late addition of flavor gives gum a very fast, high flavor release, whereas early addition gives gum a delayed, low impact flavor release. Splitting flavor to early and late simultaneous addition may give a controlled early and late release of flavor to obtain optimized sensory properties. For extruded gum by a continuous process, the high-efficiency mixing allows flavors to be added early or late to a closed system for a short mixing time of 5 seconds or a long mixing time of 30 seconds and obtain a product with good quality controlled release flavor.

Flavors may also be dried and added at different locations during extrusion, or some components may be added early and others later to give a unique flavor profile.

The foregoing and other advantages of the invention will become further apparent from the following detailed description of the presently preferred embodiments, read in conjunction with the accompanying examples and drawings.

BRIEF DESCRIPTION OF THE DRAWINGS

FIG. 9 is a schematic diagram of the relative arrangement of the equipment used to practice a presently preferred embodiment of the invention.

FIG. 10 is a schematic diagram of one presently preferred mixing screw configuration used in the arrangement of FIG. 9.

FIG. 11 is a schematic diagram of a second presently preferred mixing screw configuration used in the arrangement of FIG. 9.

DETAILED DESCRIPTION OF THE DRAWINGS AND PRESENTLY PREFERRED EMBODIMENTS

As used herein, the term "chewing gum" also includes bubble gum and the like. All percentages are weight percentages unless otherwise specified.

Various types of flavors behave in a similar manner, such as spearmint, peppermint, cinnamon, wintergreen, and various fruit flavors. Some fruit flavors have low and high volatile components and may be added as separate ingredients. Some ingredients may be added early and some added later. As a result, flavor profiles for fruit flavors can be altered to be more spicy or more fruity, or other variations. Also, spray dried flavors that do not become absorbed into the gum base may also be added to obtain a wide variety of flavored gum products with various controlled flavor release characteristics. Multiple flavored sensory properties may be possible with this type of high-efficiency mixing, where gum has one flavor the first few minutes, but further chewing gives a different flavor.

Because the preferred embodiment of the invention uses a high-efficiency mixer known as a blade-and-pin mixer, and utilizes the manufacture of the gum base as well as the chewing gum composition in one mixer, the total manufacture of chewing gum, using a single continuous high-efficiency mixer, without requiring the separate manufacture of chewing gum base, will first be discussed. This method can be advantageously performed using a continuous mixer whose mixing screw is composed primarily of precisely arranged mixing elements with only a minor fraction of simple conveying elements. A preferred mixer is a blade-and-pin mixer exemplified in FIG. 1. A blade-and-pin mixer uses a combination of selectively configured rotating mixer blades and stationary barrel pins to provide efficient mixing over a relatively short distance. A commercially available blade-and-pin mixer is the Buss kneader, manufactured by Buss AG in Switzerland, and available from Buss America, located in Bloomingdale, Ill.

Figure 1:
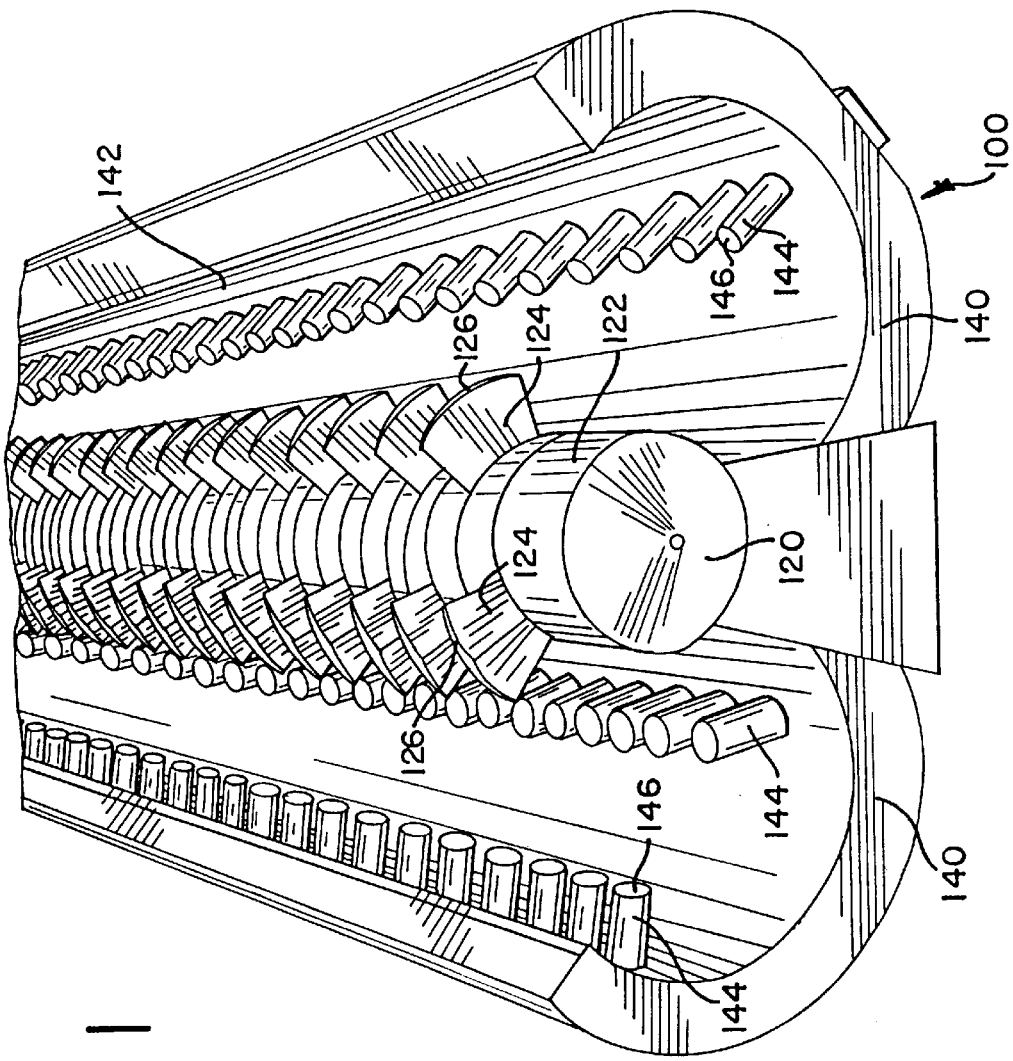
FIG. 1 is a partial exploded perspective view of a preferred Buss high-efficiency mixer used to practice the preferred method of the invention, illustrating a mixing barrel and mixing screw arrangement.

Referring to FIG. 1, a presently preferred blade-and-pin mixer 100 includes a single mixing screw 120 turning inside a barrel 140 which, during use, is generally closed and completely surrounds the mixing screw 120. The mixing screw 120 includes a generally cylindrical shaft 122 and three rows of mixing blades 124 arranged at evenly spaced locations around the screw shaft 122 (with only two of the rows being visible in FIG. 1). The mixing blades 124 protrude radially outward from the shaft 122, with each one resembling the blade of an axe.

The mixing barrel 140 includes an inner barrel housing 142 which is generally cylindrical when the barrel 140 is closed around the screw 120 during operation of the mixer 100. Three rows of stationary pins 144 are arranged at evenly spaced locations around the screw shaft 122, and protrude radially inward from the barrel housing 142. The pins 144 are generally cylindrical in shape, and may have rounded or beveled ends 146.

The mixing screw 120 with blades 124 rotates inside the barrel 140 and is driven by a variable speed motor 201 (FIG. 9). During rotation, the mixing screw 120 also moves back and forth in an axial direction, creating a combination of rotational and axial mixing which is highly efficient. During mixing, the mixing blades 124 continually pass between the stationary pins 144, yet the blades and the pins never touch each other. Also, the radial edges 126 of the blades 124 never touch the barrel inner surface 142, and the ends 146 of the pins 144 never touch the mixing screw shaft 122. ring assembly 30 during operation of the mixer 100. It should be noted that the upstream on-screw element 20 has an L/D of about ⅓, and the downstream on-screw element 21 has an L/D of about ⅔, resulting in a total L/D of about 1.0 for the on-screw elements. The restriction ring assembly 30 has a smaller L/D of about 0.45 which coincides with the L/D of the on-screw elements 20 and 21, which engage each other but do not touch the restriction ring assembly.

Figure 4:
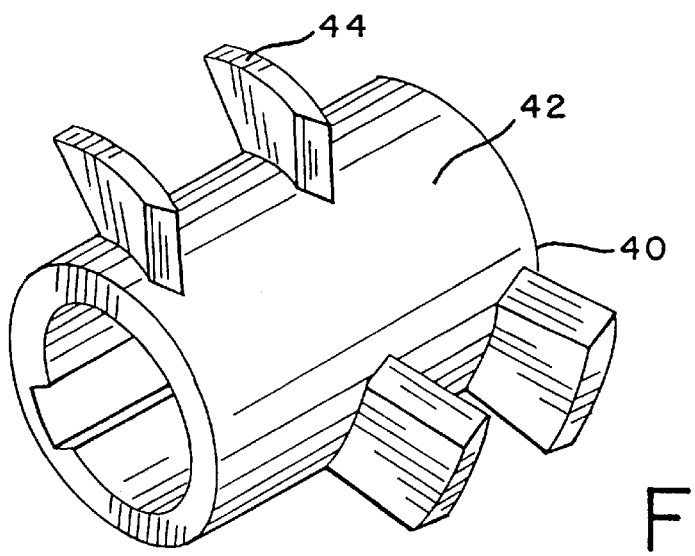
FIG. 4 is a perspective view of a low-shear mixing screw element used in a preferred high-efficiency mixer configuration.
Figure 5:
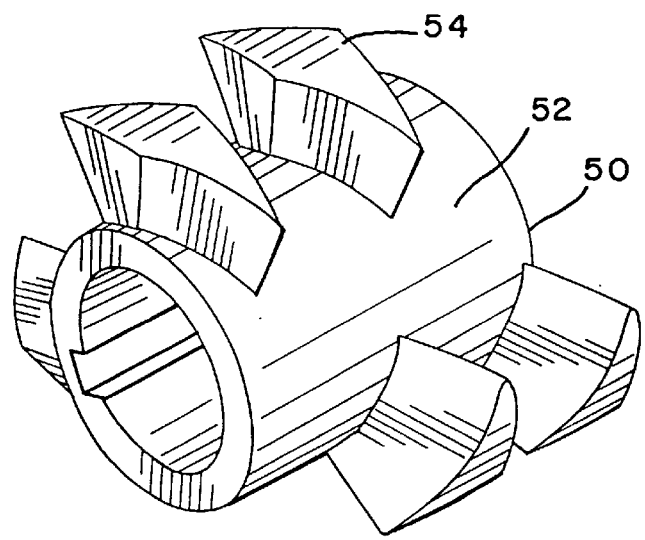
FIG. 5 is a perspective view of a high-shear mixing screw element used in a preferred high-efficiency mixer configuration.

FIGS. 4 and 5 illustrate the mixing or "kneading" elements which perform most of the mixing work. The primary difference between the lower shear mixing element 40 of FIG. 4 and the higher shear mixing element 50 of FIG. 5 is the size of the mixing blades which project outward on the mixing elements. In FIG. 5, the higher shear mixing blades 54 which project outward from the surface 52 are larger and thicker than the lower shear mixing blades 44 projecting outward from the surface 42 in FIG. 4. For each of the mixing elements 40 and 50, the mixing blades are arranged in three circumferentially-spaced rows, as explained above with respect to FIG. 1. The use of thicker mixing blades 54 in FIG. 5 means that there is less axial distance between the blades and also less clearance between the blades 54 and the stationary pins 144 as the screw 120 rotates and reciprocates axially (FIG. 1). This reduction in clearance causes inherently higher shear in the vicinity of the mixing elements 50.

Figure 6:
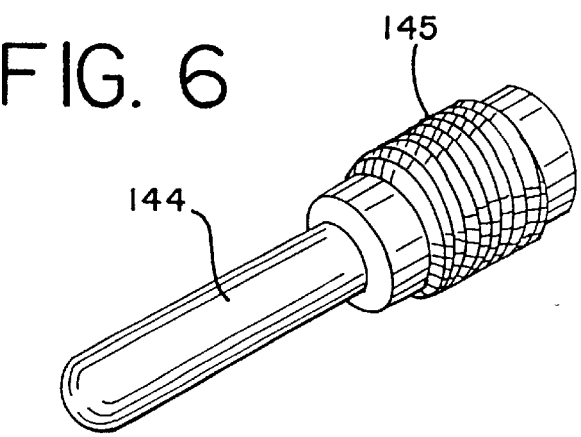
FIG. 6 is a perspective view of a barrel pin element used in a preferred high-efficiency mixer configuration.

FIG. 6 illustrates a single stationary pin 144 detached from the barrel 140. The pin 144 includes a threaded base 145 which permits attachment at selected locations along the inner barrel shaft 142. It is also possible to configure some of the pins 144 as liquid injection ports by providing them with hollow center openings.

Figure 7:
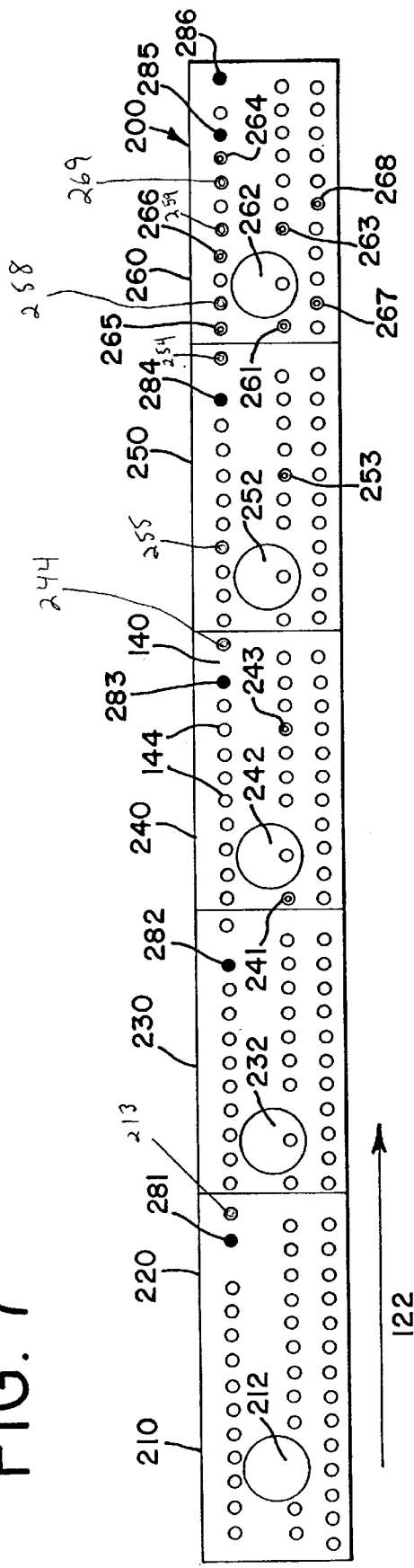
FIG. 7 is a schematic diagram of a preferred arrangement of mixing barrel pins and ingredient feed ports used to practice an embodiment of the invention.
Figure 8:
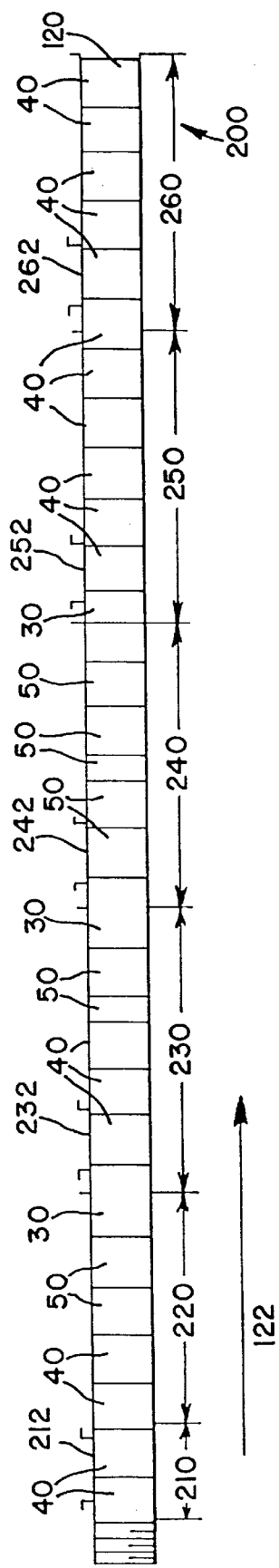
FIG. 8 is a schematic diagram of a preferred mixing screw configuration used in conjunction with FIG. 7.

FIG. 7 is a schematic view showing a preferred barrel configuration, including a preferred arrangement of barrel pins 144. FIG. 8 is a corresponding schematic view illustrating a preferred mixing screw configuration. The mixer 200 whose preferred configuration is illustrated in FIGS. 7 and 8 has an overall active mixing L/D of about 19.

FIGS. 2–6 illustrate various screw elements which can be used to configure the mixing screw 120 for optimum use. FIGS. 2A and 2B illustrate on-screw elements 20 and 21 which are used in conjunction with a restriction ring assembly. The on-screw elements 20 and 21 each include a cylindrical outer surface 22, a plurality of blades 24 projecting outward from the surface 22, and an inner opening 26 with a keyway 28 for receiving and engaging a mixing screw shaft (not shown). The second on-screw element 21 is about twice as long as the first on-screw element 20.

Figure 2A:
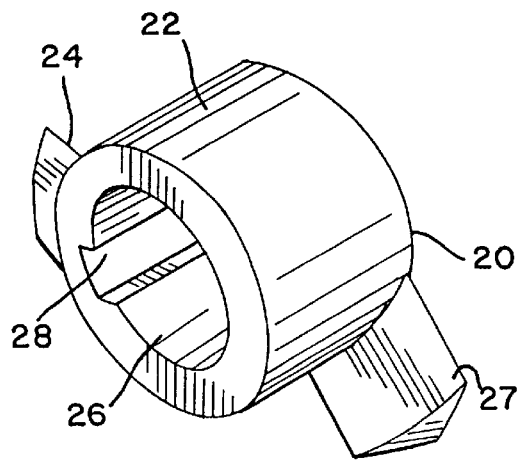
FIG. 2A is a perspective view of an on-screw element used on the upstream side of a restriction ring assembly, in a preferred high-efficiency mixer configuration.
Figure 2B:
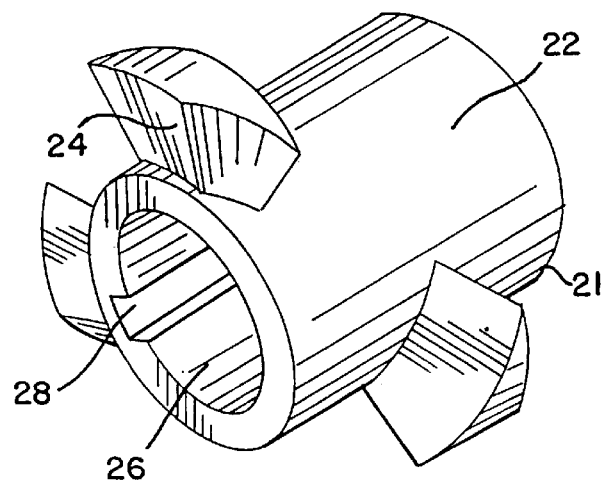
FIG. 2B is a perspective view of an on-screw element used on the downstream side of the restriction ring assembly in a preferred high-efficiency mixer configuration.
Figure 2C:
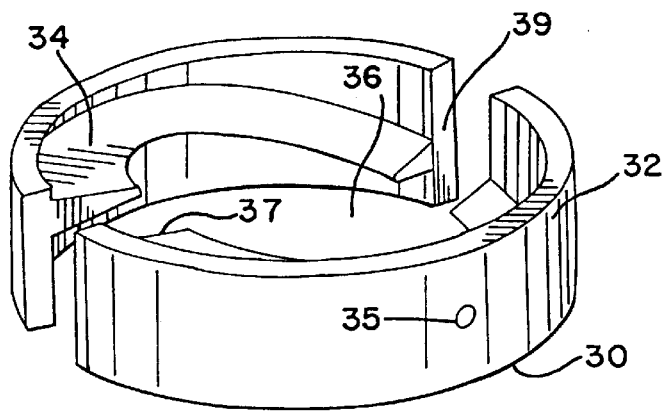
FIG. 2C is a perspective view of a restriction ring assembly used in a preferred high-efficiency mixer configuration.

FIG. 2C illustrates a restriction ring assembly 30 used to build back pressure at selected locations along the mixing screw 120. The restriction ring assembly 30 includes two halves 37 and 39 mounted to the barrel housing 142, which halves engage during use to form a closed ring. The restriction ring assembly 30 includes a circular outer rim 32, an inner ring 34 angled as shown, and an opening 36 in the inner ring which receives, but does not touch, the on-screw elements 20 and 21 mounted to the screw shaft. Mounting openings 35 in the surface 32 of both halves of the restriction ring assembly 30 are used to mount the halves to the barrel housing 142.

Figure 3:
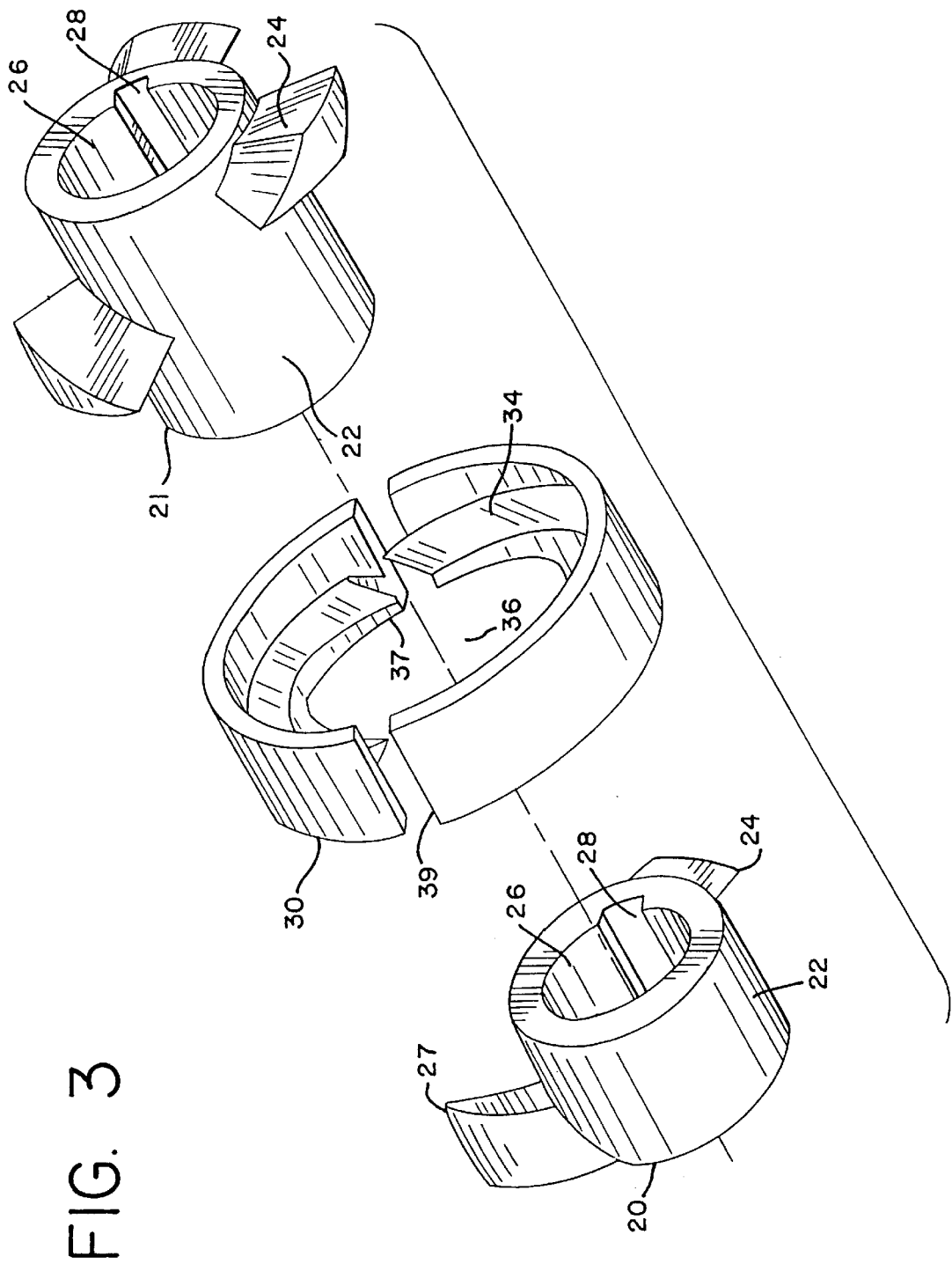
FIG. 3 is a perspective view showing the relative positioning of the elements of FIGS. 2A, 2B and 2C in a preferred high-efficiency mixer configuration.

FIG. 3 illustrates the relationship between the restriction ring assembly 30 and the on-screw elements 20 and 21 during operation. When the mixing screw 120 is turning inside the barrel 140, and reciprocating axially, the clearances between the on-screw elements 20 and 21 and the inner ring 34 provide the primary means of passage of material from one side of the restriction ring assembly 30 to the other. The on-screw element 20 on the upstream side of the restriction ring assembly includes a modified blade 27 permitting clearance of the inner ring 34. The other on-screw element 21 is placed generally downstream of the restriction ring assembly 30, and has an end blade (not visible) which moves close to and wipes the opposite surface of the inner ring 34.

The clearances between outer surfaces 22 of the on-screw elements 20 and 21 and the inner ring 34 of the restriction ring assembly 30, which can vary and preferably are on the order of 1–5 mm, determine to a large extent how much pressure build-up will occur in the upstream region of the restriction The mixer 200 includes an initial feed zone 210 and five mixing zones 220, 230, 240, 250 and 260. The zones 210, 230, 240, 250 and 260 include five possible large feed ports 212, 232, 242, 252 and 262, respectively, which can be used to add major (e.g. solid) ingredients to the mixer 200. The zones 240 and 260 are also configured with smaller liquid injection ports 241, 243, 253, 261, 263, 264, 265, 266, 267 and 268 which are used to add liquid ingredients. The liquid injection ports 241, 243, 253, 261, 263, 264, 265, 266, 267, and 268 include special barrel pins 144 formed with hollow centers, as explained above. As such, the positions of the smaller liquid injection ports can readily be changed. Also, not all of the injection ports need be used during a particular gum manufacturing operation. In that case, normal barrel pins will be used at the locations marked in FIG. 7 as a liquid injection port. Temperature sensors may also be used on some barrel pins 144 to measure product temperatures within the mixer.

Referring to FIG. 7, barrel pins 144 are preferably present in most or all of the available locations, in all three rows as shown.

Referring to FIG. 8, one preferred configuration of the mixing screw 120 for some chewing gum products is schematically illustrated as follows. Zone 210, which is the initial feed zone, is configured with about 1⅓ L/D of low 20G shear elements, such as the element 40 shown in FIG. 4. The L/D of the initial feed zone 210 is not counted as part of the overall active mixing L/D of 19, discussed above, because its purpose is merely to convey ingredients into the mixing zones.

The first mixing zone 220 is configured, from left to right (FIG. 8), with two low shear mixing elements 40 (FIG. 4) followed by two high shear elements 50 (FIG. 5). The two low shear mixing elements contribute about 1⅓ L/D of mixing, and the two high shear mixing elements contribute about 1⅓ L/D of mixing. Zone 220 has a total mixing L/D of about 3.0, including the end part covered by a 57 mm restriction ring assembly 30 with cooperating on-screw elements 20 and 21 (not separately designated in FIG. 8).

The restriction ring assembly 30 with cooperating on-screw elements 20 and 21, straddling the end of the first mixing zone 220 and the start of the second mixing zone 230, have a combined L/D of about 1.0, part of which is in the second mixing zone 230. Then, zone 230 is configured, from left to right, with three low shear mixing elements 40 and 1.5 high shear mixing elements 50. The three low shear mixing elements contribute about 2.0 L/D of mixing, and the 1.5 high shear mixing elements contribute about 1.0 L/D of mixing. Zone 230 has a total mixing L/D of about 4.0.

Straddling the end of the second mixing zone 230 and the start of the third mixing zone 240 is a 60 mm restriction ring assembly 30 with cooperating on-screw elements 20 and 21 having an L/D of about 1.0. Then, zone 240 is configured, from left to right, with 4.5 high shear mixing elements 50 contributing a mixing L/D of about 3.0. Zone 240 also has a total mixing L/D of about 4.0.

Straddling the end of the third mixing zone 240 and the start of the fourth mixing zone 250 is another 60 mm restriction ring assembly 30 with cooperating on-screw elements having an L/D of about 1.0. Then, the remainder of the fourth mixing zone 250 and the fifth mixing zone 260 are configured with eleven low shear mixing elements 40 contributing a mixing L/D of about 7⅓. Zone 250 has a total mixing L/D of about 4.0, and zone 260 has a total mixing L/D of about 4.0.

Before explaining where the various chewing gum ingredients are added to the continuous mixer 200, and how they are mixed, it is helpful to discuss the composition of typical chewing gums that can be made using the method of the invention. A chewing gum generally includes a water soluble bulk portion, a water insoluble chewing gum base portion, and one or more flavoring agents. The water soluble portion dissipates over a period of time during chewing. The gum base portion is retained in the mouth throughout the chewing process.

The insoluble gum base generally includes elastomers, elastomer plasticizers (resins), fats, oils, waxes, softeners and inorganic fillers. The elastomers may include polyisobutylene, isobutylene-isoprene copolymer, styrene butadiene copolymer and natural latexes such as chicle. The resins may include polyvinyl acetate and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candellia, carnauba and polyethylene wax.

The gum base typically also includes a filler component such as calcium carbonate, magnesium carbonate, talc, dicalcium phosphate and the like; softeners, including glycerol monostearate and glycerol triacetate; and optional ingredients such as antioxidants, color and emulsifiers. The gum base constitutes between 5–95% by weight of the chewing gum composition, more typically 10–50% by weight of the chewing gum, and most commonly 20–30% by weight of the chewing gum.

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5–15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5–95% by weight of the chewing gum, more typically 20–80% by weight of the chewing gum and most commonly 30–60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, manitol, and the like, alone or in combination.

High intensity sweeteners may also be present and are commonly used with sugarless sweeteners. When used, high intensity sweeteners typically constitute between 0.001–5% by weight of the chewing gum, preferably between 0.01–1% by weight of the chewing gum. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may provide additional sweetness such as with aqueous sugar or alditol solutions.

Flavor should generally be present in the chewing gum in an amount within the range of about 0.1–15% by weight of the chewing gum, preferably between about 0.2–5% by weight of the chewing gum, most preferably between about 0.5–3% by weight of the chewing gum. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, cinnamon, anise and the like. Artificial flavoring agents and components may also be used in the flavor ingredient of the invention. Natural and artificial flavoring agents may be combined in any sensorially acceptable fashion.

Optional ingredients such as colors, emulsifiers, pharmaceutical agents and additional flavoring agents may also be included in chewing gum.

In the preferred embodiments of the invention, the gum base and ultimate chewing gum product are made continuously in the same mixer. Generally, the gum base portion is made using a mixing L/D of about 25 or less, preferably about 20 or less, most preferably about 15 or less. Then, the remaining chewing gum ingredients, including the rework, are combined with the gum base to make a chewing gum product using a mixing L/D of about 15 or less, preferably about 10 or less, most preferably about 5 or less. The mixing of the gum base ingredients and the remaining chewing gum ingredients may occur in different parts of the same mixer or may overlap.

When the preferred blade-and-pin mixer is used, having the configuration described above, the total chewing gum can be made using a mixing L/D of about 19. The gum base can be made using an L/D of about 15 or less, and the remaining gum ingredients can be combined with the gum base using a further L/D of about 5 or less.

In order to accomplish the total chewing gum manufacture using the preferred blade-and-pin mixer 200 (FIG. 1), it is advantageous to maintain the rpm of the mixing screw 120 at less than about 150, preferably less than about 100. Also, the mixer temperature is preferably optimized so that the gum base is at about 130° F. or lower when it initially meets the other chewing gum ingredients, and the chewing gum product is at about 130° F. or lower (preferably 125° F. or lower) when it exits the mixer. This temperature optimization can be accomplished, in part, by selectively heating and/or water cooling the barrel sections surrounding the mixing zones 220, 230, 240, 250 and 260 (FIG. 7).

In order to manufacture the gum base, the following procedure can be followed. The elastomer, filler, and at least some of the elastomer solvent are added to the first large feed port 212 in the feed zone 210 of the mixer 200, and are subjected to highly dispersive mixing in the first mixing zone 220 while being conveyed in the direction of the arrow 122. The remaining elastomer solvent (if any) and polyvinyl acetate are added to the second large feed port 232 in the second mixing zone 230, and the ingredients are subjected to a more distributive mixing in the remainder of the mixing zone 230.

Fats, oils, waxes (if used), emulsifiers and, optionally, colors and antioxidants, are added to the liquid injection ports 241 and 243 in the third mixing zone 240, and the ingredients are subjected to distributive mixing in the mixing zone 240 while being conveyed in the direction of the arrow 122. At this point, the gum base manufacture should be complete, and the gum base should leave the third mixing zone 240 as a substantially homogeneous, lump-free compound with a uniform color.

The fourth mixing zone 250 is used primarily to cool the gum base, although minor ingredient addition may be accomplished. Then, to manufacture the final chewing gum product, glycerin, corn syrup, other bulk sugar sweeteners, rework gum, high intensity sweeteners, and flavors can be added to the fifth mixing zone 260, and the ingredients are subjected to distributive mixing. If the gum product is to be sugarless, hydrogenated starch hydrolyzate or sorbitol solution can be substituted for the corn syrup and powdered alditols can be substituted for the sugars.

Glycerin may be added to the first liquid injection port 261 in the fifth mixing zone 260. Solid ingredients (bulk sweeteners, encapsulated high intensity sweeteners, etc.) are added to the large feed port 262. Syrups (corn syrup, hydrogenated starch hydrolyzate, sorbitol solution, etc.) are added to the next liquid injection port 263, and flavors are added to the final liquid injection port 264. Flavors can alternatively be added at ports 261 and 263 in order to help plasticize the gum base, thereby reducing the temperature and torque on the screw. This may permit running of the mixer at higher rpm and throughput.

The effect of adding flavor very late in the continuous process, such as at injection port 264, is to obtain a gum product having a very fast flavor release, short duration, and high initial impact. The flavor is preferably mixed only about 5–10 seconds in the gum, compared to conventional gum manufacturing where flavor is mixed about 5 minutes. The effect of adding flavor a little earlier in the continuous process, such as at injection port 263, is to obtain a gum product having a slower flavor release, longer duration and mild flavor impact.

Flavor may also be added at injection port 261 to thoroughly mix the flavor with gum base to give even further delayed flavor release, with milder, lower flavor impact. Also the flavor may be split in half and each half injected at different ports to obtain both high flavor release and impact, and flavor duration for controlled flavor release.

The gum ingredients are compounded to a homogeneous mass which is discharged from the mixer as a continuous stream or "rope". The continuous stream or rope can be deposited onto a moving conveyor and carried to a forming station, where the gum is shaped into the desired form such as by pressing it into sheets, scoring, and cutting into sticks. Because the entire gum manufacturing process is integrated into a single continuous mixer, there is less variation in the product, and the product is cleaner and more stable due to its simplified mechanical and thermal histories.

Testing The Suitability Of A Continuous Mixer

The following preliminary test can be employed to determine whether a particular continuous mixer with a particular configuration meets the requirements of a high-efficiency mixer suitable for practicing the preferred method of the invention.

A dry blend of 35.7% butyl rubber (98.5% isobutylene-1.5% isoprene copolymer, with a molecular weight of 120,000–150,000, manufactured by Polysar, Ltd. of Sarnia, Ontario, Canada as POLYSAR Butyl 101-3); 35.7% calcium carbonate (VICRON 15—15 from Pfizer, Inc., New York, N.Y.); 14.3% polyterpene resin (ZONAREZ 90 from Arizona Chemical Company of Panama City, Fla.) and 14.3% of a second polyterpene resin (ZONAREZ 7125 from Arizona Chemical Company) is fed into the continuous mixer in question equipped with the mixer configuration to be tested. The temperature profile is optimized for the best mixing, subject to the restriction that the exit temperature of the mixture does not exceed 170° C. (and preferably remains below 160° C.) to prevent thermal degradation. In order to qualify as a suitable high-efficiency mixer, the mixer should produce a substantially homogeneous, lump-free compound with a uniform milky color in not more than about 10 L/D, preferably not more than about 7 L/D, most preferably not more than about 5 L/D.

To thoroughly check for lumps, the finished rubber compound may be stretched and observed visually, or compressed in a hydraulic press and observed, or melted on a hot plate, or made into a finished gum base which is then tested for lumps using conventional methods.

Also, the mixer must preferably have sufficient length to complete the manufacture of the gum base, and of the chewing gum product, in a single mixer, using a total mixing L/D of not more than about 40. Any mixer which meets these requirements falls within the definition of a high-efficiency mixer suitable for practicing the preferred method of the invention.

EXAMPLES

All of the examples were made using the following gum formula:

| All of the examples were made using the following gum formula: | |
|---|---|
| Base | 19.46 |
| Sugar | 62.24 |

-continued

| All of the examples were made using the following gum formula: | |
|---|---|
| 45.5° Baume Corn Syrup | 15.57 |
| Glycerin | 1.05 |
| Color | 0.29 |
| Flavor | 1.39 |
| | 100.00 |

All of the examples were made on a BUSS blade-and-pin mixer with a 100 mm diameter mixing screw, set up with heated tanks, feeders and pumps as shown in FIG. 9, with minor variations explained below. The mixer 200 was set up with five mixing zones having a total mixing L/D of 19, and an initial conveying zone having an L/D of 1⅓. No die was used at the end of the mixer, unless indicated otherwise, and the product mixture exited as a continuous rope.

Liquid ingredients were fed using volumetric pumps from tanks 272, 276, 277 and 278 into the large feed ports 212 and smaller liquid injection ports. The pumps were appropriately sized and adjusted to achieve the desired feed rates.

Dry ingredients were added using gravimetric screw feeders 271, 273, 274 and 275 into the large addition ports 212, 232 and 262. Again, the feeders were appropriately sized and adjusted to achieve the desired feed rates.

Temperature control was accomplished by circulating fluids through jackets surrounding each mixing barrel zone and inside the mixing screw. Water cooling was used where temperatures did not exceed 200° F., and oil cooling was used at higher temperatures. Where water cooling was desired, tap water (typically at about 57° F.) was used without additional chilling.

Temperatures were recorded for both the fluid and the ingredient mixture. Fluid temperatures were set for each barrel mixing zone (corresponding to zones 220, 230, 240, 250 and 260 in FIGS. 7 and 8), and are reported below as Z1, Z2, Z3, Z4 and Z5, respectively. Fluid temperatures were also set for the mixing screw 120.

Actual mixture temperatures were recorded by temperature sensors 281, 282, 283, 284, 285 and 286 (FIG. 7). These sensors were located near the downstream end of mixing zones 220, 230, 240 and 250 and at two places in mixing zone 260. Actual mixture temperatures are influenced by the temperatures of the circulating fluid, the heat exchange properties of the mixture and surrounding barrel, and the mechanical heating from the mixing process, and often differ from the set temperatures due to the additional factors.

All ingredients were added to the continuous mixer at ambient temperature (about 77° F.) unless otherwise noted.

The screw was configured for Examples 1–2 as follows (FIG. 11):

In the first barrel section, four low shear then two high shear elements having a total L/D of 4 were fitted to the screw shaft. Straddling the end of the first section and the beginning of the second was a 57 mm restriction ring which, along with its on-screw hardware, had a L/D of 1.

In the second section, three low shear elements then 1½ high shear elements having a total L/D of 3 were fitted. Straddling the end of the second section and beginning of the third was a 60 mm restriction ring (1 L/D).

In the third section was fitted 4½ high shear elements (3 L/D). A 60 mm restriction ring (1 L/D) straddled the third and fourth sections.

The fourth section was fitted with 5½ low shear elements (3⅔ L/D), the last of which extended in to the fifth section.

The fifth section was fitted with two conveyor elements, one adjacent to the ingredient addition port 262 and each having an L/D of 1. This was followed by 2½ low shear elements having a total L/D of 1⅔. The total screw length was 20⅓ L/D.

The screw for Examples 3 and 4 was configured as shown in FIG. 10. The configuration is the same as that in FIG. 11 except that the fourth section was reconfigured and fitted with 5 low shear elements (3⅓ L/D) and not extended into the fifth section. The fifth section was fitted with 2 conveying elements, one adjacent to the ingredient addition port, and each having an L/D of 1. This was followed by a ½, then 2½ low shear elements having a total L/D of 2.

For all examples, the zone temperatures ($Z_1$–$Z_5$ in ° F.) were set to 350, 350, 150, 55 and 55. The screw was heated to 150° F.

Several premix compositions were prepared to simplify the mixing process.

Rubber Blend

Three parts butyl rubber were ground with one part calcium carbonate. 32.785% of the ground mixture was dry blended with 51.322% calcium carbonate and 15.893% glycerol ester of hydrogenated rosin.

Polyvinyl Acetate Blend 48.421% low molecular weight PVAc was dry blended with 11.849% glycerol ester of polymerized rosin and 39.730% glycerol ester of hydrogenated rosin.

| Fat Blend | |
|---|---|
| The following ingredients were melted and blended: | |
| 7.992% | Hydrogenated Soybean Oil |
| 13.712% | Hydrogenated Cottonseed Oil |
| 12.199% | Glycerol Monostearate |
| 37.070% | Paraffin Wax |
| 28.851% | Microcrystalline Wax |
| 0.176% | BHT |

Corn Syrup/Glycerin Blend 93.710% 45.5° Baume corn syrup was heated and blended with 6.290% glycerin.

Sugar/Color Blend

10% of a glycerin slurry of red lake was mixed with 90% sugar in a Hobart mixer. The resulting product was a damp powder which could be fed into the extruder with a twin screw volumetric feeder.

The feed ports for the mixer are depicted in FIGS. 7 and 9. To the first port 212 were added the rubber blend (34.67 lbs/hr) from feeder 271 and molten polyisobutylene (5.80 lbs/hr) from tank 272.

Into the second port 232 was added the polyvinyl acetate blend from feeder 273 at 24.98 lbs/hr.

The molten fat blend was injected in equal portions from tank 276 through two injection pins 241 and 243 in section 240 at a total rate of 26.98 lbs/hr.

Sugar was added into the fifth port 262 from feeder 275 at a rate of 283.15 lbs/hr along with the sugar/color blend from feeder 274 at 13.87 lbs./hr.

The flavor and corn syrup/glycerin blend were added at different points in the examples, as specified below. Cinnamon flavor was injected at a rate of 6.62 lbs/hr. The heated corn syrup/glycerin blend was injected at a rate of 78.92 lbs/hr.

This produced a total output of approximately 475 lbs/hr from the extruder.

With this configuration, it was necessary to operate the screw at 110 rpm in order to prevent a backup of sugar in the fifth intake port.

Example 1

The gum formula was made as described above, with flavor added at pin 266 (FIG. 7) and syrup/glycerin added at pin 268. The finished gum exited at 121° F. Both the screw speed and the exit temperature were considered excessive.

Example 2

The gum formula was made as described above, with flavor added at pin 264, and syrup at pin location 268. The final product discharge temperature was 124° F.

Example 3

The gum formula was made as described above, with flavor added at pin 266 and syrup/glycerin added at pin 268.

Example 4

The gum formula was made as described above, with flavor added at pin 264 and syrup added at pin 268.

Sensory evaluation of the gums of Examples 1 and 2 indicated that the flavor aroma was higher, and more spicy, with slightly slow release for the gum of Example 1, whereas the gum of Example 2 had a deeper, more "brown," spicy cinnamon flavor that lacked hot spicy notes. In later stages of chewing, the gum of Example 2 had a stronger flavor than that of Example 1.

Sensory evaluation of the gum of Example 3 and 4 indicated that the gum of Example 3 had a lower flavor level, slower release, with lower hot spicy notes. Also, the gum of Example 3 had a late minty flavor that was long lasting. The gum of Example 4 had a thin, but clean aroma, but the flavor had high heat and an overpowering flavor impact. The overall flavor was higher, but not as long lasting.

These sensory results indicate flavors added in the earlier mix are milder and long lasting, but flavor added later will give more flavor impact. Thus the flavor release can be controlled by the point of addition.

Example 5 Inventive

To test the effect of simultaneously adding different flavor components at different locations in an extruder, a batch of sugar fruit gum was prepared. The fruit flavor components were divided into three groups based on their solubility parameters. Component groups A, B and C had low, medium and high δ values respectively. (Higher δ values correspond to greater water solubility.)

A Buss extruder was configured substantially similar to the previous examples and addition rates were adjusted to provide a total output of 300 lbs/hr. The low δ portion of the flavor was continuously injected through a hollow pin 269 (FIG. 7) in the middle of zone 260. The medium δ flavor components were simultaneously injected at pin 254 near the end of zone 250 and the high δ components were simultaneously injected at pin 255 near the middle of zone 250. The extruder was run at 70 rpm with the five zone temperatures set to 200° F., 200° F., 200° F., 65° F., 65° F. for zones 220, 230, 240, 250 and 260 respectively. The product emerged at 50° C.

Example 6 Inventive

A run was made with conditions identical to Example 5 except that the low, medium and high δ components were continuously and simultaneously injected at pins 255, 254 and 269 respectively.

Example 7 Inventive

Identical to Example 5 except that the low, medium and high δ components were continuously and simultaneously injected at pins 269, 213 and 259 respectively.

Example 8 Inventive

Identical to Example 5 except that the low, medium and high δ components were continuously and simultaneously injected at pins 258, 265 and 254 respectively.

Example 9 Inventive

A run was made with conditions identical to Example 5 except that the low, medium and high δ components were continuously and simultaneously injected at pins 269, 265 and 244 respectively.

Example 10 Comparative

A peppermint flavored gum was made according to the process similar to that of Example 5 except that a four section Buss extruder was used. The temperatures of the four zones were set to 300° F., 300° F., 100° F., 71° F. respectively and the extruder was run at 80 rpm. The flavor was a two part system consisting of a reduced-menthol peppermint oil and pure I-menthol crystals. For Example 10, the two components were blended together and injected continuously through a hollow pin near the end of the fourth zone.

Example 11 Inventive

The process of Example 10 was repeated except that the two flavor components were not preblended. Instead, the reduced-menthol peppermint oil was continuously injected through the same pin as in Example 10 but the menthol crystals were simultaneously added through the port into the second zone along with polyvinyl acetate and terpene resin.

The gums of Examples 10 and 11 were compared for sensory properties. The gum of Example 11 was found to have lower cooling initially, more peppermint character, a better flavor blend and higher cooling after 4–6 minutes chewing.

Example 12 Inventive

A fruit flavor chewing gum having both initial impact and long lasting flavor may be prepared as follows: A Buss extruder is operated as in Example 5 except that a complete fruit flavor is continuously and simultaneously injected into the extruder through pins in pins 269 and 213.

It should be appreciated that the methods of the present invention are capable of being incorporated in the form of a variety of embodiments, only a few of which have been illustrated and described above. The invention may be embodied in other forms without departing from its spirit or essential characteristics. It will be appreciated that the addition of some other ingredients, process steps, materials or components not specifically included will have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A method of producing chewing gum with a controlled flavor release comprising the steps of:
   a) continuously adding chewing gum ingredients to a continuous mixer, the chewing gum ingredients comprising one or more flavoring agents, the continuous mixer comprising a plurality of spatially separated feed inlets through which the chewing gum ingredients are added to the mixer, and the one or more flavoring agents being added to the mixer simultaneously through at least two of the feed inlets;
   b) subjecting the chewing gum ingredients to a continuous mixing operation within the mixer, thereby forming a chewing gum composition; and
   c) continuously discharging the chewing gum composition from the mixer while chewing gum ingredients continue to be introduced and mixed within the mixer.

2. The method of claim 1 wherein the chewing gum ingredients are added at a constant rate.

3. The method of claim 1 wherein the continuous mixer comprises one piece of equipment.

4. The method of claim 1 wherein the continuous mixer comprises a blade-and-pin mixer.

5. The method of claim 4 wherein the flavor is injected into the mixer through two different pins.

6. The method of claim 1 wherein the chewing gum ingredients comprise chewing gum base ingredients.

7. The method of claim 6 wherein the chewing gum base ingredients comprise a hard elastomer and a filler and the filler is mixed with the hard elastomer prior to any substantial mastication of the hard elastomer.

8. The method of claim 1 wherein the flavoring agents added at the at least two feed inlets are the same.

9. The method of claim 1 wherein different flavoring agents are added at the at least two feed inlets.

10. A method of controlling the flavor release characteristics of a chewing gum composition comprising the steps of:
    a) continuously adding chewing gum ingredients, including one or more flavoring agents, into a continuous mixer having a plurality of spatially separated feed inlets serving as locations into which the chewing gum ingredients are added to the mixer, the one or more flavoring agents being added to the mixer simultaneously through at least two or more of the feed inlets;
    b) subjecting the chewing gum ingredients to a continuous mixing operation within the mixer, thereby forming a chewing gum composition;
    c) continuously discharging the chewing gum composition from the mixer while chewing gum ingredients continue to be introduced and mixed within the mixer; and
    (d) selecting the locations at which the one or more flavoring agents are added to the mixer for the purpose of controlling the flavor release characteristics of the chewing gum composition; the chewing gum composition being discharged having flavor release characteristics dependent on the locations at which the one or more flavoring agents are added to the mixer.

11. The method of claim 10 wherein the method of selecting the location at which the one or more flavoring agents are added comprises changing the location of addition between a first point in time and a second point in time.

12. The method of claim 11 wherein the same chewing gum ingredients are being added to the mixer at the first and second points in time.

13. The method of claim 10 wherein the flavoring agent comprises an ingredient selected from the group consisting of citrus oil, fruit essences, peppermint oil, spearmint oil, other mint oils, clove oil, oil of wintergreen, anise, cinnamon and mixtures thereof.

14. A method of continuously manufacturing chewing gum with controlled flavor release comprising the steps of:
    a) adding at least an elastomer and filler into a high-efficiency continuous mixer, and mixing the elastomer and filler together in the continuous mixer;
    b) adding at least one ingredient selected from the group consisting of fats, oils, waxes and elastomer plasticizers into the continuous mixer, and mixing said ingredient with the elastomer and filler in the continuous mixer; and
    c) adding at least one sweetener and at least one flavor into the continuous mixer, and mixing said sweetener and flavor with the remaining ingredients to form a chewing gum composition;
    d) wherein steps a)–c) are performed using a single high-efficiency continuous mixer and wherein the flavor is simultaneously added to the mixer through at least two feed inlets selected for the purpose of controlling the release rate of the flavor from the chewing gum; and the chewing gum composition thus formed has flavor release characteristics dependent on the locations at which the at least one flavor is added to the mixer.

15. The method of claim 14 wherein steps a)–c) are performed using a mixing L/D of not more than about 40.

16. The method of claim 15 wherein steps a) and b) are performed using a mixing L/D of not more than about 25.

17. The method of claim 15 wherein step c) is performed using a mixing L/D of not more than about 15.

18. The method of claim 14 wherein the continuous mixer comprises a blade-and-pin mixer.

19. A method of continuously manufacturing chewing gum with controlled flavor release comprising the steps of:
    a) adding at least an elastomer and filler into a blade-and-pin mixer, and mixing the elastomer and filler together using blades and pins;
    b) adding at least one ingredient selected from the group consisting of fats, oils, waxes and elastomer plasticizers into the blade-and-pin mixer, and mixing said at least one ingredient with the elastomer and filler using blades and pins; and
    c) adding at least one sweetener and at least one flavor into the blade-and-pin mixer, and mixing said sweetener and flavor with the remaining ingredients to form a chewing gum product, said flavor being added simultaneously at two or more spatially separated points within the mixer.

20. The method of claim 19 wherein the blade-and-pin mixer comprises first, second, third, fourth and fifth mixing zones.

21. The method of claim 20 wherein steps a) and b) are substantially performed before the fifth mixing zone.

22. The method of claim 20 wherein step c) is substantially performed after the third mixing zone.

23. The method of claim 22 wherein the two or more spatially separated points are in the fifth mixing zone.

24. The method of claim 19 wherein the blades are mounted to a mixing screw which rotates at less than about 150 rpm.

25. The method of claim 19 wherein the mixer includes one or more points of restriction upstream from where step c) is performed.

26. The method of claim 25 wherein the one or more points of restriction are created by one or more restriction rings.

* * * * *

UNITED STATES PATENT AND TRADEMARK OFFICE
CERTIFICATE OF CORRECTION

Page 1 of 6

PATENT NO. : 6,030,647
DATED : 2/29/2000
INVENTOR(S) : Joo H. Song et al.

It is certified that error appears in the above-identified patent and that said Letters Patent is hereby corrected as shown below:

On the title page, item [56] insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 1 | 8 | 5 | 2 | 0 | 0 | 5 | 04/05/32 | Garbutt | | | |
| | | 1 | 8 | 5 | 5 | 0 | 1 | 7 | 04/19/32 | Geller | | | |
| | | 1 | 8 | 8 | 7 | 9 | 3 | 0 | 11/15/32 | Hatherell | | | |
| | | 1 | 9 | 5 | 3 | 2 | 9 | 5 | 04/03/34 | Garbutt | | | |
| | | 2 | 1 | 2 | 3 | 5 | 3 | 1 | 07/12/38 | Hatherell | | | |
| | | 2 | 1 | 2 | 5 | 5 | 6 | 2 | 08/02/38 | Hatherell | | | |
| | | 2 | 1 | 9 | 7 | 2 | 4 | 0 | 04/16/40 | Hatherell | | | |
| | | 2 | 2 | 5 | 6 | 1 | 9 | 0 | 09/16/41 | Bowman | | | |
| | | 2 | 2 | 8 | 4 | 8 | 0 | 4 | 06/02/42 | De Angelis | | | |
| | | 2 | 2 | 8 | 8 | 1 | 0 | 0 | 06/30/42 | Mason | | | |
| | | 2 | 3 | 8 | 3 | 1 | 4 | 5 | 08/21/45 | Moose | | | |
| | | 2 | 4 | 6 | 8 | 3 | 9 | 3 | 04/26/49 | Corkery et al. | | | |
| | | 3 | 6 | 1 | 8 | 9 | 0 | 2 | 11/09/71 | Brennen, Jr. | | | |
| | | 3 | 7 | 9 | 5 | 7 | 4 | 4 | 03/05/74 | Ogawa et al. | | | |
| | | 3 | 8 | 2 | 6 | 8 | 4 | 7 | 07/30/74 | Ogawa et al. | | | |
| | | 3 | 9 | 8 | 4 | 5 | 7 | 4 | 10/05/76 | Comollo | | | |
| | | 3 | 9 | 9 | 5 | 0 | 6 | 4 | 11/30/76 | Ehrgott et al. | | | |
| | | 4 | 0 | 6 | 4 | 2 | 7 | 4 | 12/01/77 | Mackay et al. | | | |
| | | 4 | 0 | 6 | 8 | 0 | 0 | 4 | 01/10/78 | Carlin et al. | | | |
| | | 4 | 1 | 8 | 7 | 3 | 2 | 0 | 02/05/80 | Koch et al. | | | |
| | | 4 | 2 | 0 | 2 | 9 | 0 | 6 | 05/13/80 | Ogawa et al. | | | |
| | | 4 | 2 | 0 | 8 | 4 | 3 | 1 | 06/17/80 | Friello et al. | | | |
| | | 4 | 2 | 1 | 7 | 3 | 6 | 8 | 08/12/80 | Witzel et al. | | | |
| | | 4 | 2 | 2 | 4 | 3 | 4 | 5 | 09/23/80 | Tezuka et al. | | | |
| | | 4 | 2 | 5 | 2 | 8 | 3 | 0 | 02/24/81 | Kehoe et al. | | | |

UNITED STATES PATENT AND TRADEMARK OFFICE
CERTIFICATE OF CORRECTION

Page 2 of 6

PATENT NO. : 6,030,647
DATED : 2/29/2000
INVENTOR(S) : Joo H. Song et al.

It is certified that error appears in the above-identified patent and that said Letters Patent is hereby corrected as shown below:

U. S. PATENT DOCUMENTS

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | | 4 | 2 | 5 | 4 | 1 | 4 | 8 | 03/03/81 | Ogawa et al. | | | |
| | | 4 | 3 | 0 | 5 | 9 | 6 | 2 | 12/15/81 | del Angel | | | |
| | | 4 | 3 | 5 | 2 | 8 | 2 | 2 | 10/05/82 | Cherukuri et al. | | | |
| | | 4 | 3 | 5 | 7 | 3 | 5 | 4 | 11/02/82 | Kehoe et al. | | | |
| | | 4 | 3 | 7 | 9 | 1 | 6 | 9 | 04/05/83 | Reggio et al | | | |
| | | 4 | 3 | 8 | 6 | 1 | 0 | 6 | 05/31/83 | Merritt et al. | | | |
| | | 4 | 3 | 8 | 7 | 1 | 0 | 8 | 06/07/83 | Koch et al. | | | |
| | | 4 | 4 | 5 | 2 | 8 | 2 | 0 | 06/05/84 | D'Amelia et al. | | | |
| | | 4 | 4 | 5 | 9 | 3 | 1 | 1 | 07/10/84 | DeTora et al. | | | |
| | | 4 | 4 | 9 | 0 | 3 | 9 | 5 | 12/25/84 | Cherukuri et al. | | | |
| | | 4 | 5 | 1 | 4 | 4 | 2 | 3 | 04/30/85 | Tezuka et al. | | | |
| | | 4 | 5 | 1 | 5 | 7 | 6 | 9 | 05/07/85 | Merritt et al. | | | |
| | | 4 | 5 | 5 | 5 | 4 | 0 | 7 | 11/26/85 | Kramer et al. | | | |
| | | 4 | 5 | 9 | 0 | 0 | 7 | 5 | 05/20/86 | Wei et al. | | | |
| | | 4 | 7 | 1 | 1 | 7 | 8 | 4 | 12/08/87 | Yang | | | |
| | | 4 | 7 | 2 | 1 | 6 | 2 | 0 | 01/26/88 | Cherukuri et al. | | | |
| | | 4 | 7 | 3 | 8 | 8 | 5 | 4 | 04/19/88 | Friello et al. | | | |
| | | 4 | 7 | 4 | 0 | 3 | 7 | 6 | 04/26/88 | Yang | | | |
| | | 4 | 7 | 9 | 4 | 0 | 0 | 3 | 12/27/88 | Cherukuri et al. | | | |
| | | 4 | 8 | 1 | 6 | 2 | 6 | 5 | 03/28/89 | Cherukuri et al. | | | |
| | | 4 | 8 | 5 | 0 | 8 | 4 | 2 | 07/25/89 | Van Alstine | | | |
| | | 4 | 8 | 7 | 2 | 8 | 8 | 4 | 10/10/89 | Cherukuri et al. | | | |
| | | 4 | 8 | 7 | 6 | 0 | 9 | 5 | 10/24/89 | Yang | | | |
| | | 4 | 8 | 8 | 2 | 1 | 7 | 2 | 11/21/89 | Van Alstine | | | |
| | | 4 | 9 | 3 | 3 | 1 | 8 | 9 | 06/12/90 | Cherukuri et al. | | | |

UNITED STATES PATENT AND TRADEMARK OFFICE
CERTIFICATE OF CORRECTION

Page 3 of 6

PATENT NO. : 6,030,647
DATED : 2/29/2000
INVENTOR(S) : Song et al.

It is certified that error appears in the above-identified patent and that said Letters Patent is hereby corrected as shown below:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 4 | 9 | 4 | 0 | 5 | 9 | 4 | 07/10/90 | Van Alstine | | | |
| | | 4 | 9 | 6 | 8 | 5 | 1 | 1 | 11/06/90 | D'Amelia et al. | | | |
| | | 4 | 9 | 9 | 2 | 2 | 8 | 0 | 02/12/90 | Yung Chu et al. | | | |
| | | 5 | 0 | 2 | 3 | 0 | 9 | 3 | 06/11/91 | Cherukuri et al. | | | |
| | | 5 | 0 | 5 | 9 | 1 | 0 | 3 | 10/22/91 | Bruckmann et al. | | | |
| | | 5 | 0 | 7 | 5 | 2 | 9 | 1 | 12/24/91 | DuRoss | | | |
| | | 5 | 1 | 1 | 0 | 6 | 0 | 7 | 05/05/92 | Yang | | | |
| | | 5 | 1 | 3 | 5 | 7 | 6 | 0 | 08/04/92 | Degady et al. | | | |
| | | 5 | 1 | 5 | 8 | 7 | 2 | 5 | 10/27/92 | Handa et al. | | | |
| | | 5 | 1 | 5 | 8 | 7 | 8 | 9 | 10/27/92 | DuRoss | | | |
| | | 5 | 2 | 2 | 9 | 1 | 4 | 8 | 07/20/93 | Copper | | | |
| | | 5 | 3 | 2 | 4 | 5 | 3 | 0 | 06/28/94 | Kehoe et al | | | |
| | | 5 | 3 | 9 | 7 | 5 | 8 | 0 | 03/14/95 | Song et al. | | | |
| | | 5 | 4 | 1 | 3 | 7 | 9 | 9 | 05/09/95 | Song et al. | | | |
| | | 5 | 4 | 1 | 5 | 8 | 8 | 0 | 05/16/95 | Song et al. | | | |
| | | 5 | 4 | 1 | 9 | 9 | 1 | 9 | 05/30/95 | Song et al. | | | |
| | | | | H | 1 | 2 | 4 | 1 | 10/05/93 | Synosky et al. | | | |

UNITED STATES PATENT AND TRADEMARK OFFICE
CERTIFICATE OF CORRECTION

PATENT NO. : 6,030,647
DATED : 2/29/2000
INVENTOR(S) : Joo H. Song et al.

It is certified that error appears in the above-identified patent and that said Letters Patent is hereby corrected as shown below:

FOREIGN PATENT OR PUBLISHED FOREIGN PATENT APPLICATION

| | | | | DOCUMENT NUMBER | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|---|
| | | 1 | 5 | 3 | 8 | 7 | 8 | 5 | 01/24/79 | Great Britain | | | | |
| | | 2 | 0 | 4 | 9 | 7 | 0 | 5 | 12/31/80 | Great Britain | | | | |
| | 0 | 2 | 7 | 3 | 8 | 0 | 9 | A2 | 07/06/88 | EPO | | | * | |
| | 0 | 5 | 2 | 4 | 9 | 0 | 2 | A1 | 01/27/93 | EPO | | | * | |
| | | 2 | 6 | 3 | 5 | 4 | 4 | 1 | 02/23/90 | France | | | * | |
| | WO | 95 | / | 10194 | | | | | 20.04.95 | PCT | | | | |
| | WO | 95 | / | 10947 | | | | | 27.04.95 | PCT | | | | |
| | WO | 95 | / | 08272 | | | | | 30.03.95 | PCT | | | | |
| | WO | 95 | / | 10948 | | | | | 27.04.95 | PCT | | | | |

| | OTHER ART (Including Author, Title, Date, Pertinent Pages, etc.) |
|---|---|
| A77 | _Food Manufacturing_, "Extrusion: does chewing gum pass the taste test?" pp. 48-50, September 1987. |
| A78 | _Ingredients Extra_, "Extrusion technology for chewing gum production" pp. 4 and 12, June 1994. |
| A79 | _J. Agric. Food Chem._, "Thermal Decomposition of Some Phenolic Antioxidants" pp. 1063-69, Vol. 39, 1991. |
| A80 | Two page document entitled "Mixing Processes used in the Manufacture of Chewing Gum," by R. Schilling, undated. |

UNITED STATES PATENT AND TRADEMARK OFFICE
CERTIFICATE OF CORRECTION

PATENT NO. : 6,030,647
DATED : 2/29/2000
INVENTOR(S) : Joo H. Song et al.

It is certified that error appears in the above-identified patent and that said Letters Patent is hereby corrected as shown below:

|  |  |  |
|---|---|---|
|  | A81 | Three page letter from Buss America dated August 22, 1989 describing Buss kneading extruder and its uses. |
|  | A82 | Brochure entitled "D-TEX Continuous Compounding Twin Screw Extruders," 4 pages, published by Davis-Standard (undated). |
|  | A83 | Brochure entitled "Continuous Mixers For The Polymer Industry," Bulletin No. 234-B, published by Farrel Corporation, 1991. |
|  | A84 | Brochure entitled "Farrel-Rockstedt Twin-Screw Extruders," 6 pages, published by Farrel Corporation (undated). |
|  | A85 | Brochure entitled, "Leistritz Extrusionstechnik, The Universal Laboratory Extruder System," 24 pages, published by American Leistritz Extruder Corporation (undated). |
|  | A86 | Brochure entitled, "Leistritz Extrusionstechnik, The Multi-Extrusion-System for Mixing-, Kneading- and Strandextrusion ZSE GG+GL," 20 pages, published by American Leistritz Extruder Corporation (undated). |
|  | A87 | Two page document from Rubber Extrusion Technology program, dated February 8-10, 1993. |
|  | A88 | Brochure entitled "Buss Kneading Extruder Technology for the Food Industry," 18 pages, (undated) |
|  | A89 | Brochure entitled "Extrusion Processing of Shear-Sensitive Food Products," 23 pages, November 1987. |
|  | A90 | Advertisement entitled "Buss Extrusion Technology (40 years of experience included)," 1 page, undated. |
|  | A91 | Brochure entitled "The Teledyne Readco Continuous Processor," 2 pages, published by Teledyne Readco, York, PA (undated). |
|  | A92 | Brochure entitled "Mitsubishi PTE Twin-Screw Extruder," 6 pages, Mitsubishi Heavy Industries, Ltd. (date unknown). |

UNITED STATES PATENT AND TRADEMARK OFFICE
CERTIFICATE OF CORRECTION

PATENT NO. : 6,030,647
DATED : 2/29/2000
INVENTOR(S) : Joo H. Song et al.

It is certified that error appears in the above-identified patent and that said Letters Patent is hereby corrected as shown below:

| | | |
|---|---|---|
| | A93 | Brochure entitled "Mitsubishi Thermoplastic Extruders," 10 pages, Mitsubishi Heavy Industries, Ltd. (date unknown). |
| | A94 | Brochure entitled "Buss Technology For The Continuous Compound of Gum Base," by George Fischer of Buss Gruppe, April 22, 1995, 9 pages. |
| | A95 | Brochure entitled "Buss Technology For The Continuous Compounding of Chewing Gum and Bubble Gum," by Bernd Rose of Buss Gruppe, April 24, 1995, 8 pages. |
| | A96 | Brochure entitled "Production of Chewing Gum and Bubble Gum Masses on the Buss Kneading-Extruder," March 1985, 8 pages. |
| | A97 | Brochure entitled, "VERFAHRENSTECHNIECHE ORIENTIERUNG NR. 42" (Process Technology Guide No. 42), August 22, 1983, 25 pages (and an English translation thereof, 15 pages). |
| | A98 | Article entitled, "Herstellung und Aromatisierung von Kaugummi auf Basis von Saccharose und Zuckeraustrausch-stoffen," January 1981, 21 pages. |
| | A99 | Article entitled, "Chewing Gum Formulation," from *The Manufacturing Confectioner*, September 1988, 8 pages. |
| | A100 | Brochure entitled, "Chewing Gum," by Axel H. Suck, 59 pages, undated. |

Signed and Sealed this

Sixth Day of June, 2000

*Attest:*

Q. TODD DICKINSON

*Attesting Officer*     *Director of Patents and Trademarks*